No. 659,511. Patented Oct. 9, 1900.
A. DIDIERJEAN.
TWO SPEED GEARING FOR VELOCIPEDES.
(Application filed May 23, 1898.)
(No Model.) 2 Sheets—Sheet 1.
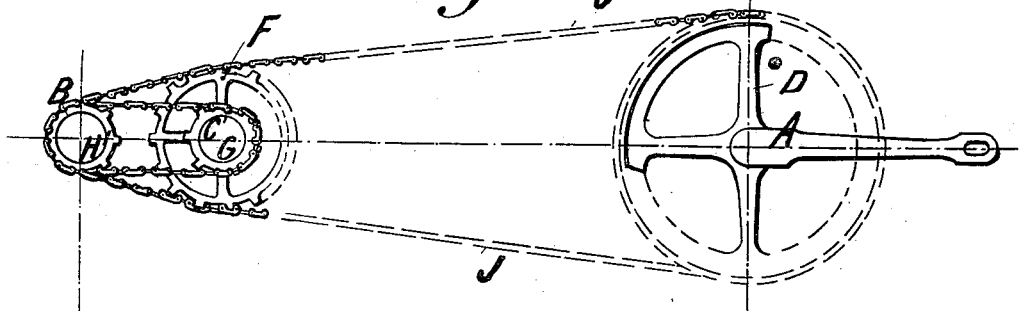
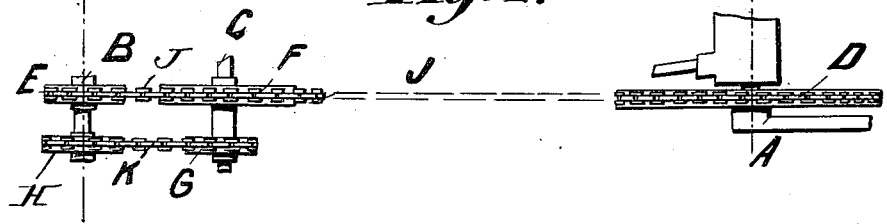
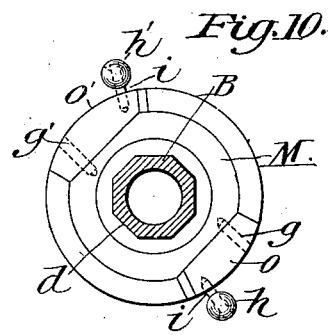
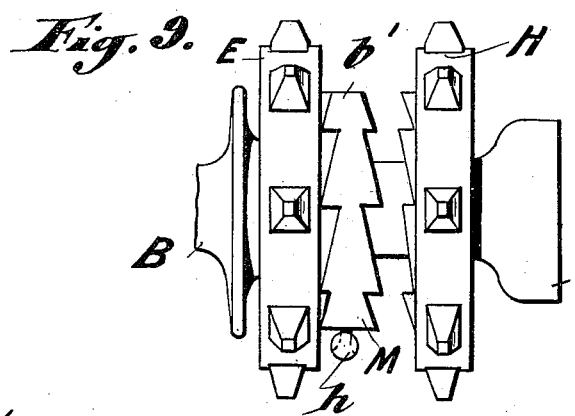
Witnesses:
A. E. Boulter.
H. K. Boulter.
Inventor
Alexis Didierjean
By Wm. E. Boulter,
Attorney
THE NORRIS PETERS CO., PHOTO-LITHO., WASHINGTON, D. C.

No. 659,511. Patented Oct. 9, 1900.
A. DIDIERJEAN.
TWO SPEED GEARING FOR VELOCIPEDES.
(Application filed May 23, 1898.)
(No Model.) 2 Sheets—Sheet 2.
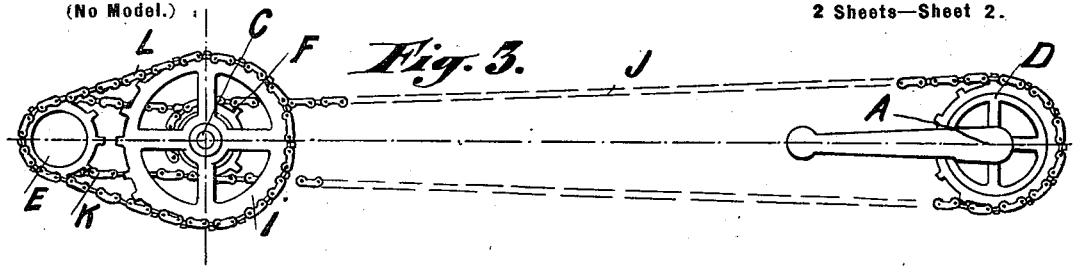
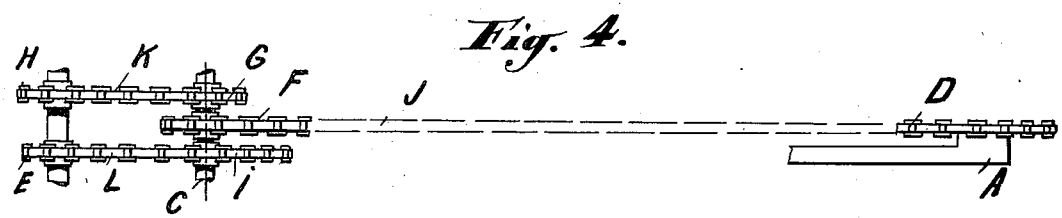
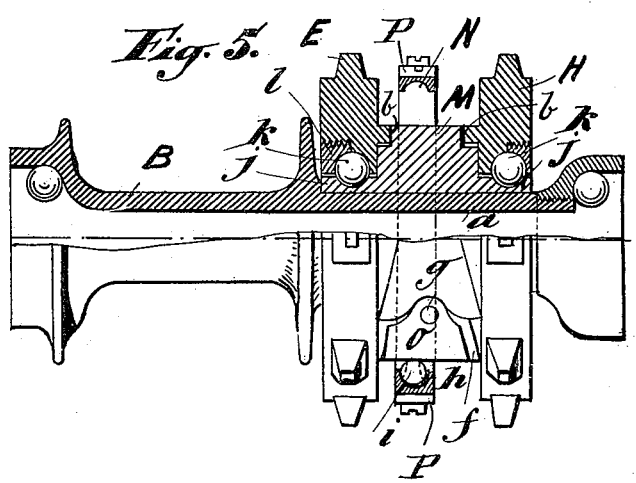
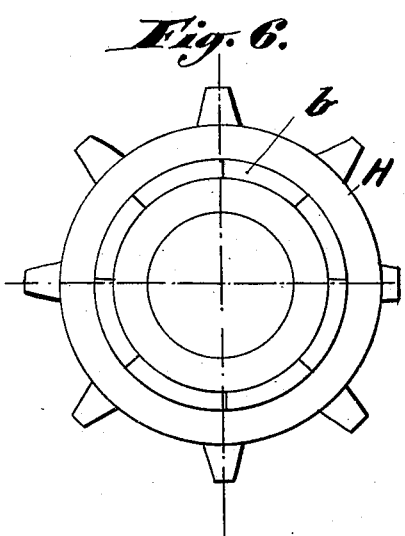
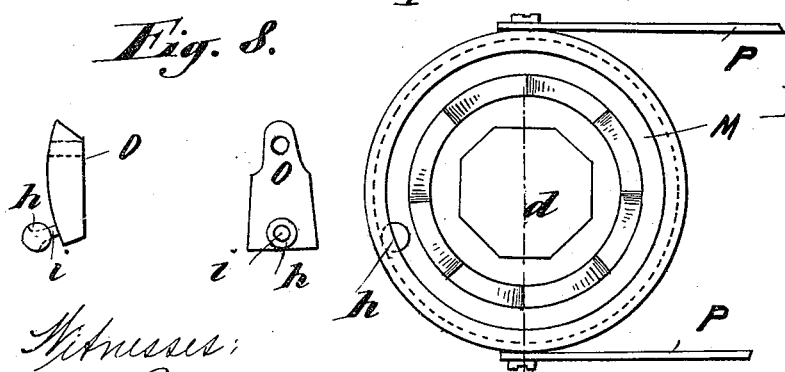
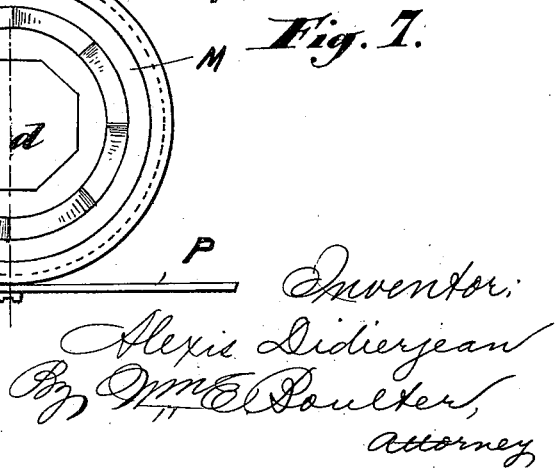
Witnesses:
A. E. Boulter
J. H. K. Boulter
Inventor:
Alexis Didierjean
By Wm. E. Boulter,
Attorney
THE NORRIS PETERS CO., PHOTO-LITHO., WASHINGTON, D. C.

UNITED STATES PATENT OFFICE.

ALEXIS DIDIERJEAN, OF ST. QUENTIN, FRANCE.

TWO-SPEED GEARING FOR VELOCIPEDES.

SPECIFICATION forming part of Letters Patent No. 659,511, dated October 9, 1900.

Application filed May 23, 1898. Serial No. 681,496. (No model.)

*To all whom it may concern:*

Be it known that I, ALEXIS DIDIERJEAN, a citizen of the Republic of France, residing at St. Quentin, France, have invented certain new and useful Improvements in Two-Speed Gearing for Velocipedes and other Vehicles, of which the following is a specification.

The present invention relates to velocipedes and motor-cycles driven by transmission-chains; and the special object thereof is an arrangement allowing the speed of the velocipedes or motor-cycles to be instantaneously changed without dismounting any part thereof.

The arrangements for changing speed hitherto employed are very expensive, of a disagreeable view, and often very difficult to operate. Moreover, these arrangements do not allow of obtaining a desired variation of speed.
These inconveniences are obviated by the construction and arrangement of parts hereinafter fully described, illustrated in the drawings, and pointed out in the appended claim.

In the annexed drawings is given as an example a practical form of construction of the improved arrangement.

In the drawings, Figure 1 shows an elevation of the mechanism for change of speed. Fig. 2 is a plan view of the same mechanism.
Fig. 3 shows an elevation of another mechanism different from the preceding one. Fig. 4 is a plan view of the latter mechanism. Fig. 5 shows the hub of the driving-wheel, partly seen in longitudinal section. Fig. 6 is a side view of one of the pinions of the driving-wheel. Fig. 7 is a side view of the clutch coupling-box and the collar thereof. Fig. 8 shows the clutch of the coupling-box in front and side views. Fig. 9 is a front view of the coupling arrangement different from the preceding one. Fig. 10 is an end view of the coupling with the outer sprocket removed.

In the various figures similar letters of reference denote corresponding parts.

A indicates the axle of the crank.

B is the hub of the driving-wheel.

D is the driving transmission-wheel mounted on the crank-axle.

E is the full-speed pinion of the driving-wheel.

C is an axle driven by the intermediate pinion F.

G is a pinion mounted on the intermediate axle and driving the half-speed pinion of the driving-wheel.

H is the half-speed pinion of the driving-wheel.

I is a pinion of the intermediate axle driving the full-speed pinion of the driving-wheel.

J indicates the driving-chain.

K and L are the transmission-chains.

M is a coupling-box.

N indicates the coupling-collar.

O indicates the clutches, and P are the operating-levers of the collar N.

The intermediate axle C, placed in a same horizontal plane with the axle A of the crank and the axle B of the driving-wheel, is arranged between these two axles on the frame of the machine adapted for this purpose, Figs. 1 and 2.

On the intermediate axle are mounted the pinions F and G, the said pinion F being in the same vertical plane with the wheel D and the pinion B and the said pinion G driving the pinion H by means of the chain K.

The two pinions H and E are loosely mounted on the hub B of the driving-wheel, and the pinion E is driven by the driving-chain J, engaging also with the wheel F to actuate the intermediate axle C, Figs. 1 and 2.

With the arrangement shown in Figs. 3 and 4 the pinions H and E are respectively driven by the transmission-pinions G and I and the chains K L, and the driving-chain J actuates only the pinion F, wedged on the intermediate axle C.

The pinions E and H of the driving-wheel are made integral with the hub of said driving-wheel by means of the coupling shown in Figs. 5, 6, and 7 of the annexed drawings. The coupling-box is composed of a sleeve M, located between the loosely-mounted pinions E and H and having at its center an octagonal hole *d*, within which fits the end of hub B. The sleeve M has two diametrically-opposite notches *f*, receiving the movable clutch-teeth O O', adapted to turn around pivots *g g'*, respectively, said pivots being secured to sleeve M. The free ends of said clutch-teeth carry screws *i*, on which are rotatably held small balls *h h'*. A circular ring or collar N, having an inner semicircular groove, is fitted around said balls *h h'* and adapted to be moved sidewise by means of levers P P, secured to the collar and extending within reach of the hands of the occupant of the machine. On the extremities $j$ of the sleeve are arranged the pinions E H, which by means of balls $k$, held in position by screw-nuts $l$, turn freely on the said sleeve M, the said pinions being moreover provided on their inner side faces with a ratchet-toothing $b$, with which can successively engage the said clutch O. As said ring N and teeth O O' are moved to the right, Fig. 5, said teeth will be brought in engagement with corresponding clutch-teeth on the inner side of pinion H, whereby the latter will be rotated with sleeve M and therefore with hub B. On the other hand, as said ring or collar N is moved to the left, Fig. 5, said teeth O O' will be disengaged from pinion H and brought in engagement with corresponding clutch-teeth on the inner side of pinion E, whereby the latter will be rotated with sleeve M and therefore with hub B.

The coupling arrangement shown in Fig. 9 differs from the preceding one in that the pinions E H turn directly on the hub of the driving-wheel and in that the clutches O are replaced by ratchet-toothings $b'$, arranged on the lateral faces of the sleeve M and producing the engaging (coupling) of one of the pinions E H with the said sleeve if this sleeve be removed to the right or the left by means of the levers P and the collar N, arranged in the same way as with the coupling shown in Figs. 5 and 7.

Let us suppose for easy demonstration and as an example the driving transmission-wheel D, Figs. 1 and 2, having twenty-four teeth, the wheel F having sixteen teeth, and the pinions E G H having each eight teeth. By each revolution of the crank-shaft the pinion E makes three turns, while the wheel F, and consequently the pinions G and H, will make but one and one-half turns. If either half or full speed is to be obtained, it will be sufficient to cause the pinion H or the pinion F, engaging with the sleeve M by moving by means of the levers P, Figs. 5 and 7, the collar N to the right or to the left, to engage the clutches O with the suitable pinion now carrying the said sleeve, and thus transmitting by the said sleeve the movement of rotation to the driving-wheel.

The operation of the arrangement shown in Figs. 3 and 4 is the same as with the preceding one, and if we suppose the pinions E H G I always having the number of teeth already indicated and the proportion of the wheels D and F always being the same the axle C will make one and a half turns at each turn of the crank-shaft, and consequently the pinion E, driven by the pinion I, will make three turns, while the pinion H, driven by the pinion G, will only make one and a half turns. In order to obtain the one or the other velocity, it suffices, therefore, to cause the sleeve of the coupling-box to engage with the one or the other of the pinions E H.

It will be seen that according to the velocities to be obtained the number of axles and intermediate pinions may be increased and that, furthermore, by placing a similar arrangement on the other side of the driving-wheel four changes of speed are produced instead of two.

Having fully described my invention, what I claim, and desire to secure by Letters Patent, is—

In a change-speed gear, the combination with a driving sprocket-wheel, of a rear driven axle, a wheel thereon, sprocket-wheels arranged over and loose with respect to the hub of said wheel and provided with opposing clutch-teeth, an intermediate axle, sprocket-wheels mounted thereon, means for communicating motion from the sprocket-wheel on the crank-axle to the said sprocket-wheels on the intermediate axle and the loose sprocket-wheels, and a coupling device for transmitting motion from either of the loose sprocket-wheels to the rear driven wheel, comprising a sleeve mounted on the hub of the latter wheel and carrying the loose sprocket-wheels and provided on its periphery with notches and clutches pivoted to the sleeve and adapted to move laterally to engage the clutch-teeth of the loose sprocket-wheels, a roller carried by each of the clutches at its outer end, a ring with which the rollers engage, and means for shifting the ring laterally for the purpose specified.

In testimony whereof I have signed this specification in the presence of two subscribing witnesses.

ALEXIS DIDIERJEAN.

Witnesses:
EDOUARD BOURCHAINBY,
HELARION HIRSCHLE.